United States Patent [19]

Dow et al.

[11] Patent Number: 5,351,247
[45] Date of Patent: Sep. 27, 1994

[54] ADAPTIVE FAULT IDENTIFICATION SYSTEM

[75] Inventors: Howard E. Dow, Lexington; Ruby Li, Chelmsford; Terry W. Potter, Acton, all of Mass.

[73] Assignee: Digital Equipment Corporation, Maynard, Mass.

[21] Appl. No.: 20,030

[22] Filed: Feb. 18, 1993

Related U.S. Application Data

[63] Continuation of Ser. No. 376,498, Jul. 7, 1989, abandoned, which is a continuation-in-part of Ser. No. 292,436, Dec. 30, 1988, abandoned.

[51] Int. Cl.$^5$ ............................................. G06F 15/18
[52] U.S. Cl. .................................. 371/15.1; 371/16.1; 395/20; 395/575; 395/911; 395/916
[58] Field of Search ...................... 371/15.1, 16.1; 395/911, 916, 917, 575, 20

[56] References Cited

U.S. PATENT DOCUMENTS

| | | |
|---|---|---|
| 3,976,864 | 8/1976 | Gordon et al. |
| 4,084,260 | 4/1978 | Fleming et al. ............ 365/49 |
| 4,434,489 | 2/1984 | Blyth . |
| 4,709,366 | 11/1987 | Scott et al. . |
| 4,757,463 | 7/1988 | Ballou et al. ............ 364/551.01 |
| 4,847,795 | 7/1989 | Baker et al. ............ 364/579 |
| 4,964,125 | 10/1990 | Kim ............ 371/15.1 |
| 5,099,436 | 3/1992 | McCown et al. ............ 364/550 |

OTHER PUBLICATIONS

Dunning, B., "Self-Learning Data-Base for Automated Fault Localization", *Autotestcon '79*, pp. 155-157.
Hewlett-Packard, *Electronic Instruments and Systems 1979*, pp. 147-149, 568, 569.
Aleksander, I., et al., "Guide to Pattern Recognition Using Random-Access Memories", *Computers and Digital Techniques*, Feb. 1979, vol. 2, No. 1, pp. 29-40.
Varghese, K., et al., "Simplified ATPG and Analog Fault Location Via a Clustering and Seperability Technique", *IEEE Trans. on Circuits and Systems*, vol. CA-S-26, No. 7, Jul. 1979, pp. 496-504.
Pau, L., "Integrated Testing and Algorithms for Visual Inspection of Integrated Circuits", *IEEE Trans. on Pattern Analysis and Machine Intelligence*, vol. PAMI-5, No. 6, Nov. 1983, pp. 602-608.
Gordon, G. et al., "Hexadecimal Signatures Identify Troublespots in Microprocessor Systems", *Electronics*, Mar. 3, 1977, pp. 89-96.
Yau, S. et al., "Associative Processor Architecture-A Survey", *Computing Surveys*, vol. 9, No. 1, Mar. 1977, pp. 4-27.
Feucht, D., "Pattern Recognition: Basic Concepts and Implementations", *Computer Design*, Dec. 1977, pp. 57-68.
Pau, L., "Failure Detection Processes by an Expert System and Hybrid Pattern Recognition", *Pattern Recognition Letters 2*, Dec. 1984, pp. 419-425.
Psaltis, D. et al., "Optical Information Processing Based on an Associative-Memory Model of Neural Nets . . . ", *Optics Letters*, vol. 10, No. 2, Feb. 1985, pp. 98-100.
Soucek, B. et al., "Neural and Massively Parallel Computers", John Wiley & Sons, pub., 1988, pp. 345-354.
Batchelor, B. G., "Classification and Data Analysis in Vector Space", *Pattern Recognition*, Batchelor, B. G., ed., London, Plenum Press, pp. 67-116, 1978.

(List continued on next page.)

*Primary Examiner*—Stephen M. Baker
*Attorney, Agent, or Firm*—Kenyon & Kenyon

[57] ABSTRACT

An adaptive fault identification system identifies repeat faults by capturing data representative of a fault. The captured data is subjected to a search tool and compared to data that is known to represent faults, and if possible, the unknown fault is identified. The search tool does not need to exactly match the data representing the unknown fault to the stored data. Instead, if the recall data pattern is similar enough to some of the stored data, a list of labels is returned where each label points to a recommended corrective action. By employing a learning algorithm, the similarity comparisons can be adapted to reflect greater knowledge of faults so that more accurate similarity comparisons can be made.

65 Claims, 5 Drawing Sheets

OTHER PUBLICATIONS

Oh, Se-Young, "A Pattern Recognition and Associative Memory Approach to Power System Security Assessment." *IEE Transactions On Systems, Man And Cybernetics.* vol. SMC-16, No. 1, Jan./Feb. 1986, pp. 62–72.

Stubberud, Allen R., "Failure Isolation Using An Associative Memory Algorithm." *Proceedings of 25th Conference on Decision and Control,* Dec. 1986, pp. 1113–1115.

Simpson, W. R. and Agre, J. R., "Adaptive Fault Isolation With Learning." ARINC Research Corporation, Annapolis, Md., 1983, pp. 331–335.

Koo, F. D. and Lee, G. W., "Isolating Failures Within VLSI Chips That Incorporate Signature Analysis and Set/Scan Techniques." *International Test Conference,* 1985, pp. 372–377.

Bedrosian, S. D., "The Role of Pattern Recognition in VLSI Testing." *International Test Conference, 1986, pp. 750–754.*

Anderson, T. E., "Adaptable Fault Dictionaries: An Application of Machine Learning." Department of Computer Science, University of Washington, Jan., 1988, pp. 1–4.

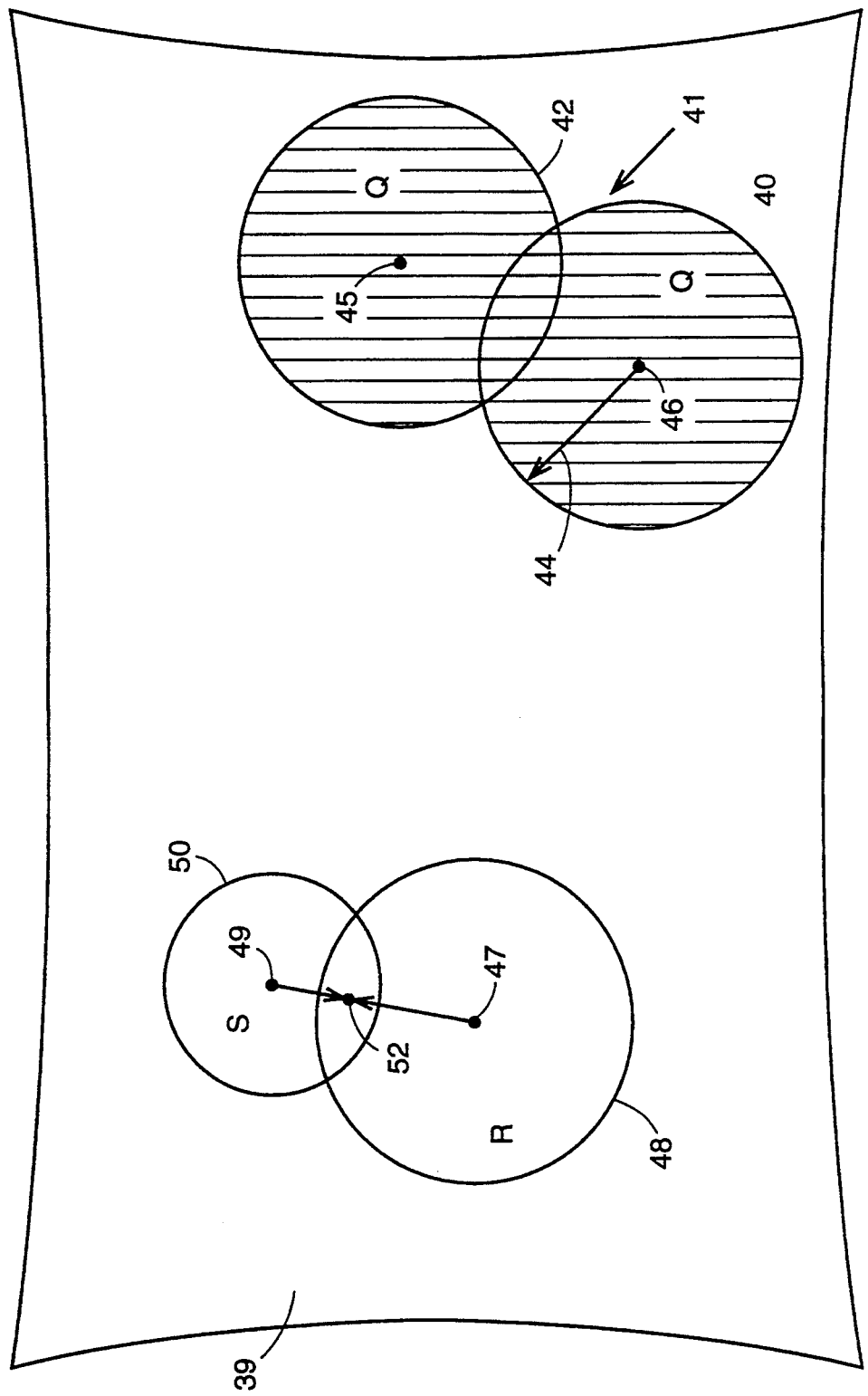

ADAPTIVE FAULT IDENTIFICATION SYSTEM

This is a continuation of application Ser. No. 376,498 filed Jul. 7, 1989, now abandoned, which is a continuation-in-part of application Ser. No. 07/292,436, filed on Dec. 30, 1988, now abandoned.

FIELD OF THE INVENTION

The present invention relates to a method and apparatus used to isolate and identify repeat faults in a system, and more particularly to isolate and diagnose repeat faults in populated computer printed circuit wiring boards.

BACKGROUND OF THE INVENTION

Characteristics which are representative of a fault condition can be represented by data patterns. When these data patterns contain sufficient information to disambiguate between the fault conditions, the data patterns can be used for identification of these conditions. The characteristics can be mechanical or electrical, for example. The vibrations of turbine blades or the signals generated by or in a power supply can both be represented by data patterns. When a fault occurs in one of these systems, data patterns of the system may be representative of the fault. One example of a data pattern is a digital bit pattern.

In the domain of populated computer printed circuit wiring boards, a data pattern can represent a machine state of the board. Thus, when faults in the board occur, the machine state of the board can be representative of the fault.

In order to diagnose an unknown defect in a board, it is known to capture a digital representation of that defect. This digital representation can be manipulated in various ways and then compared to a stored set of digital representations of known defects. If an exact bit-by-bit match of the manipulated digital representation of the unknown defect with one of the stored digital representations of the known defects is found, then the unknown defect may be identified.

The above known method has a problem in that the same defect in a system may be characterized by a number of different bit patterns. Some of these bit patterns may be very similar to one another, but are not necessarily exactly the same. Thus, since the known method requires an exact match of the unknown bit pattern with the stored bit patterns before a diagnosis can be returned, an extremely large amount of memory space is required to store the large number of known bit patterns in order to ensure that a reasonable percentage of defects can be identified.

Some known systems do not use exact matching but instead use a nearest-neighbor algorithm. This returns the closest match when no exact match is found. However, the criteria for similarity in these systems is not adjustable. Thus, the only way for these systems to increase their frequency of correct defect identification is by storing additional patterns, resulting in the same ultimate problem as with those system requiring an exact match. In addition to the increased memory requirements, the response time of the known system degrades as the number of stored patterns increase.

SUMMARY OF THE INVENTION

The above and other problems are solved in the present invention by using a method which can perform inexact searching, associate data patterns with labels and provide an adjustable similarity criteria. In an embodiment of this invention, a parallel associative memory (PAM) is used as a tool to search for similar data patterns that are stored in the PAM when the PAM is presented with a data pattern representative of an unknown repeat fault. A repeat fault is a fault that belongs to a previously encountered class of data patterns that are treated as equivalent by a learning algorithm, (an equivalence class) and meets a similarity criteria (i.e. standards for judging how similar two or more data patterns are) for one or more of the stored data patterns. Each of the data patterns stored in the production database loaded into the parallel associative memory has one or more associated labels that eventually will indicate to the diagnostician how to properly respond to the fault. The label in this embodiment is a corrective action which is known to have properly responded to the fault which produced the stored data pattern.

According to the present invention, the required similarity between a stored data pattern and a recall data pattern in order to return a match, is adjustable or adaptable. In order for a match to be returned by the apparatus, the recall data pattern, representing the unknown characteristic, must be similar enough to at least one data pattern already stored in the parallel associative memory to cause the parallel associative memory to return the label associated with the stored data pattern. In an exemplary embodiment of the invention, the label is a component identifier which is a recommended corrective action.

The fault labels associated with stored data patterns are hierarchical in some embodiments of the invention. For example, the fault label may start at some level (i.e., collection of networks, network, cluster, computer hardware system) and progress down through increasingly detailed levels (i.e., module, functional group, component, pin, state). When implementing this method, an implementor (a person who sets the parameters of the test station) may choose fault labels appropriate for any level of granularity. This information is typically obtained from a domain expert, e.g., an expert in the field of identifying defects on modules.

Labels are also usable as patterns in order to search the same or other production databases. This allows a "chained" search process to occur, resulting in one or more labels being returned.

Two features of the present invention are the ability to adjust the similarity criteria in the production database and the ability to add more data patterns/labels as more modules are tested and repaired. Since a single equivalence class may comprise many data pattern examples, this method provides one or more recommendations when: 1) the equivalence class of the recall data pattern has been previously encountered and 2) the recall data pattern falls within the similarity criteria of a specific stored data pattern (example) of the equivalence class.

This means that any data pattern which meets the above criteria does not need to be stored in the production database, thus reducing memory requirements while keeping identification accuracy and response time constant. A known learning algorithm automatically resolves conflicts and discards data patterns which meet these criteria. In this manner, the apparatus adapts and learns from these additional data patterns.

The same captured data can be processed and represented in different ways by the present invention. For example, in one embodiment the production databases are structured hierarchically and searched based on the previous search results. In another embodiment, the data is selectively processed and trained into multiple production databases and searched in parallel with each result having a "vote" towards the actual recommendation. Different captured data representative of the fault may also be used to contribute to a voting embodiment. Both of the above examples may increase identification accuracy, speed and confidence levels.

The present invention can correctly classify data patterns it has never before encountered because it can find similar stored data patterns. The invention achieves high identification accuracy by using adjustable similarity criteria. In addition, the invention can provide a list of recommendations instead of only one. When a parallel associative memory is used as the search tool, the response time of the invention does not degrade quickly due to the parallel search mechanism. Also, the present invention supports distributed diagnostic servers sharing accumulated knowledge across distributed sites.

BRIEF DESCRIPTION OF THE DRAWINGS

FIG. 4 schematically shows an example of the pattern space.

DETAILED DESCRIPTION

Figure 1:
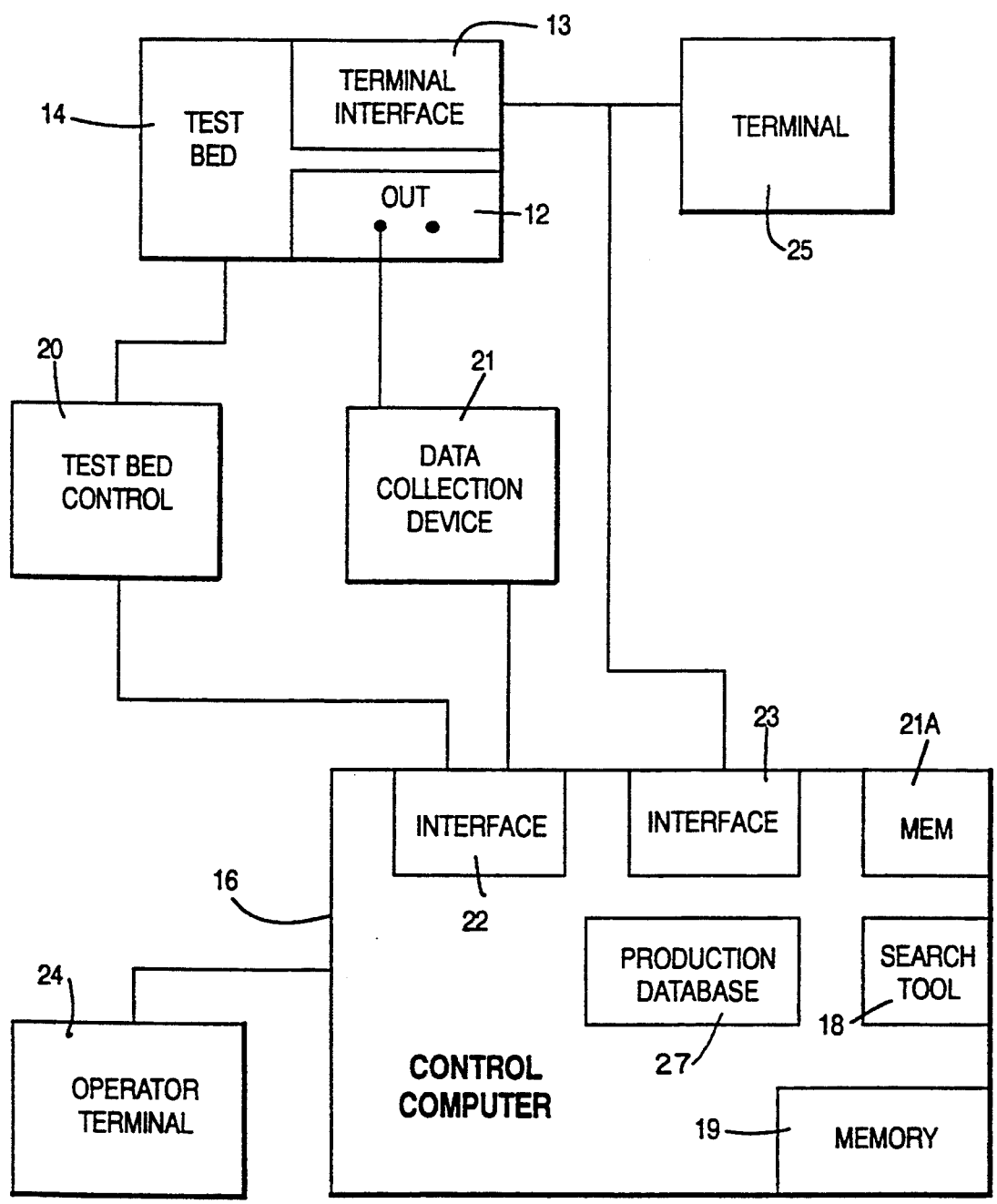
FIG. 1 shows a block diagram of an arrangement for testing populated computer printed circuit wiring boards constructed according to an embodiment of the present invention.

A test station 10 constructed according to the present invention is shown in FIG. 1. A unit to be tested, or unit-under-test (UUT) has reference number 12. For testing, the UUT 12 is inserted into a test bed 14, which can perform and interact with the UUT 12 in a manner similar to the manner in which the UUT 12 is operated in a field application. In the exemplary embodiment, the test bed 14 is the specific type of computer of which the UUT 12 is normally one element.

A control computer 16 is coupled to the test bed 14 through a test bed control 20. The UUT 12 is coupled to a data collection device 21, which is coupled to the control computer 16 through a first interface 22. The data collection device 21 captures two types of data, internal machine states and a representation of a currently executing built-in self test. This captured data may be related to a fault, and is composed of data elements. Note that a fault represents a condition which may be "good" or "bad".

A first terminal 25 is coupled to the test bed 14 via a terminal interface 13. The first terminal 25 is also coupled to a second interface 23 on the control computer 16. This connection allows the control computer 16 to capture data sent by the UUT 12 through the terminal interface 13 to the first terminal 25 and to simulate an operator who would normally interact with terminal 25. A second terminal 24 is coupled to the control computer 16 and provides output to and input from a diagnostician (i.e., the user of the test station 10).

Data elements are defined as prominent or distinctive characteristics of the captured data that can be processed into one or more data patterns. In the exemplary embodiment, the data elements comprise a data serial number of the UUT 12, the failing self test, the output from the terminal 25, and the individual address and/or data 32-bit states of the UUT 12.

The control computer 16 sends signals to the test bed control 20, which in an exemplary embodiment, is in part a computer controlled relay to turn power in the test bed 14 on and off. When the power is turned on, the test bed 14 will begin performing its built-in self test and when the built-in self test detects an abnormal condition on the suspected defective UUT 12, an indication of the failure is captured by the data collection device 21. (A built-in self test is a program provided by a manufacturer that resides internal to the UUT 12 for the purposes of testing and verifying basic functionality.) The detected failure may also be seen on the first terminal 25 and is captured/observed by the control computer 16. An example of a suitable data collection device 21 is logic analyzer HP1630G manufactured by Hewlett Packard. The interface 23 "taps" or makes a connection to the data path between the terminal interface 13 and the first terminal 25 allowing data to be captured or sent as though an operator were at the first terminal 25. In this embodiment, the terminal interface 13 is part of or resides on the UUT 12. The first and second terminals 24, 25 and the interfaces 13, 22, 23 are conventional.

The data captured by the data collection device 21 is read into the control computer 16 which analyzes the captured data to provide guidance to the diagnostician regarding the UUT 12. There is also an indication of which portion of the built-in self test is executing, this indication being monitored to determine if the machine is behaving in an unpredictable manner (i.e., if a portion of the built-in self test does not complete in the expected amount of time). The machine states captured by the data collection device 21 can be different widths, for example 32 bits wide, and it also uses a strobe line on the UUT 12 for the data capture process.

The number of machine states capturable by a commonly available logic analyzer is 1,024 machine states. It would require a great deal of memory to store 1,024 machine states that are 32 or more bits wide, however, in many circumstances, it is not necessary to use all available data for successful identification of an unknown fault. In the exemplary embodiment, the machine states used are the ones just before and/or just after the point at which the fault in the UUT 12 is detected by the built-in self test (the trigger address). One criterion for selecting machine states before and/or after this trigger address is the portion of the built-in self test which was executing when the UUT 12 failed.

The captured data can be processed into a recall data pattern which is analyzed in the control computer 16 by a search tool 18, which in one embodiment is a parallel associative memory (PAM). In the search tool 18, data captured by the data collection device 21 and processed into a recall data pattern can be compared in parallel against all the stored data patterns in a production database 27 that is loaded into the search tool 18. As will be explained in more detail later, the search tool 18 returns an ordered recommendation list of the stored data patterns in the production database 27 most similar to the recall data pattern along with their associated labels such that their similarity criteria are satisfied. The associated labels are patterns associated with stored data patterns and in this embodiment, identifies the equivalence class of which the pattern is a member. The associated labels can be a recommendation or used as patterns to search the same or other databases. In this embodiment, the search results are in the form of unique pattern identifiers and their associated distance results which are in Hamming distances. (The term "Hamming distance" is a measure of similarity which will be explained in more detail later.) Recommendations are suggested corrective actions which may repair a fault. The recommendation list is ordered by smallest Hamming distance first, i.e., the most similar patterns to the recall pattern are listed first. The number of best matches or most similar patterns returned to the diagnostician may be specified by the implementor.

An example of a search tool 18 usable with the present invention is described in more detail in U.S. patent application Ser. No. 156,542, filed Feb. 16, 1988, now U.S. Pat. No. 5,014,327 for a "Parallel Associative Memory", and which is hereby expressly incorporated by reference.

In certain embodiments, the search tool 18 uses a hierarchical search based on an indicator of which portion of the built-in self test was executing when a failure was detected, and the trigger address. The hierarchical search is produced by using a subspace mask, (which requires certain bits in the recall data pattern to match exactly with corresponding bits in a stored data pattern) on the built-in self test and the trigger address. If no matches are found in the production database 27 loaded into the search tool 18, then the search is repeated with a subspace mask only on the built-in self test. If this search also produces no recommendations, an even less restrictive search, such as nearest-neighbor search, or nearest-surface can be employed. In other words, any hierarchical search procedure can be used to obtain recommendations when initial search criteria are not satisfied.

The hierarchical search takes advantage of domain-specific knowledge gained from analyzing the captured data patterns, understanding the UUT 12 and knowing the organizational structure of the built-in self test. The hierarchical search achieved by the subspace mask is alternatively achieved in other embodiments by using multiple production databases, each containing data patterns of a particular built-in self test or self test group. Additional domain-specific knowledge is as follows: given that a UUT 12 failed in a certain built-in self test, there is a limited group of corrective actions that could possibly repair the fault. The trigger address helps to further narrow this list of corrective actions. This is possible because a typical built-in self test is designed to test a UUT 12 by functional blocks in a structural manner, working from a simple to more complex functionality. In addition, the time it takes to normally complete each test in the built-in self test is known. Although domain-specific knowledge can be used to increase identification accuracy, speed and reduce storage requirements, its use is not necessary. In other words, captured data can be applied without manipulation.

An explanation of how the comparisons are made in the search tool 18 of the recall data patterns with the stored data patterns now follows with reference to FIG. 4. A known learning algorithm partitions a pattern space 39 into equivalence classes. A data pattern is represented as a point (centroid) somewhere in the pattern space 39. Examples of stored data patterns include 45, 46, 47 and 49. In this embodiment, equivalence classes such as 41, 48 and 50 are created through the use of hyperspheres, where a hypersphere is defined as the volume of space enclosed by a n-dimensional circle the equivalence class 41 is a combination of hyperspheres 40, 42. In this embodiment, technically hypercubes are used instead of hyperspheres because of the binary nature of the data.

An equivalence class is defined by any number of hyperspheres with the same associated labels, such as label 'Q' of hyperspheres 40, 42. Since hyperspheres 40, 42 both have the label 'Q', they have both been similarly hatched in FIG. 4. Hyperspheres 48 and 50 remain unhatched although they overlap since they have labels 'R', 'S' respectively and thus belong to different equivalence classes. Each equivalence class has an associated label, and in this embodiment, each label is a recommendation. Some of the recommendations are corrective actions, which are specific repair activities that need to be performed by the diagnostician to properly respond to a fault. Thus, for each of the patterns in equivalence class 41, the same label or recommendation will be returned for patterns falling within the hyperspheres 40 and 42. In this case, the label will be 'Q'.

Each of the hyperspheres within a pattern space 39 will have a radius of attraction or distance threshold which is adjustable, this distance threshold being a similarity criterion in the exemplary embodiment. The distance threshold 44 for the hypersphere with centroid 46 is shown in FIG. 4. For a recall data pattern to be considered a member of the equivalence class 41 (a match), it must fall within either hypersphere 40 or 42. For example, a recall data pattern may be separated from the centroid 46 of the hypersphere 40 by a distance equal to or less than the distance threshold 44.

When two hyperspheres overlap but do not have the same label (i.e., have different corrective actions), such as hyperspheres 48, 50 in FIG. 4, a point 52 which falls in the overlapping region belongs to both equivalence classes defined by hyperspheres 48, 50, Therefore, either label R or S could possibly be correct. The search tool 18 produces an ordered list of the most probable labels based upon the Hamming distance of the point 52 from the centroids 47, 49 of the hyperspheres 48 and 50. For example, since the Hamming distance from point 52 is less to centroid 49 than for centroid 47, the operator is informed that the label S is the most likely recommended corrective action, with the label R being listed as the second best recommended corrective action.

In certain embodiments, the diagnostician is informed of the actual Hamming distances as a percentage, where the Hamming distance is equal to Z, and the length of the data patterns is equal to Y, with the percentage being equal to (Y minus X) divided by Y times 100. This provides the diagnostician with a measure of how much confidence to place in the respective recommendation. Other confidence measures can also be provided to the diagnostician. For example, a ratio of the distance result to the distance threshold of the stored pattern may be provided to indicate the amount of confidence to place in the match.

As one can see from FIG. 4, the use of hyperspheres having defined distance thresholds, allows a label to be returned even when there is not an exact match between a stored data pattern and a recall data pattern. A label will be returned when the similarity between the recall data pattern and the stored data pattern meets the similarity criteria. In this embodiment, the similarity criteria is met when the Hamming distance between the recall data pattern and the stored data pattern is less than or equal to the distance threshold associated with the stored data pattern. If the recall data pattern does not fall within any hypersphere, then no similar stored data pattern and associated label can be returned.

Any type of distance or similarity measurement can be used to compare any two data patterns, provided the fault conditions can be disambiguated. In this embodiment, the distance measurement in the pattern space 39 is measured by what has been referred to as the Hamming distance. The Hamming distance between two points (or data patterns in the pattern space 39) is simply the number of bits which differ between the two data patterns when compared bit-wise. For example, in the five-bit patterns 01010 and 01111, the Hamming distance would be two, since only two bits are different between the two five-bit patterns.

The present invention is considered to be adaptive since as the test station 10 is presented with more examples of data patterns and their associated labels, more hyperspheres can be added to the pattern space 39. Further, the distance threshold around centroids can be adjusted as the system sees more data patterns and associated labels. These adjustments may include but are not limited to increasing the distance threshold associated with a stored data pattern, decreasing the distance threshold associated with a stored data pattern, drifting or changing the relative position of a stored data pattern either towards or away from other data pattern(s), storing new data patterns, and deleting stored data patterns. In this embodiment, unsuccessful repair, meaning that the first recommendation was incorrect, potentially results in 1) storing the new data pattern and 2) decreasing the distance threshold associated with stored data patterns in the production database 27.

In addition to the corrective action, more information is provided to the diagnostician to aid in diagnosis. In this embodiment, the following information is provided: 1) dynamic history, 2) corrective action cost, and 3) corrective action time. The dynamic history is stored in a dynamic historical database 19 in FIG. 1. Every time a repair is actually made, this dynamic historical database 19 is updated to indicate how frequently a corrective action is performed and how frequently the corrective action is successful. The cost and approximate time information are stored in a third database 21A. Additional information like this can be presented to the diagnostician and/or integrated with the search results from the production database 27 to substantiate, modify or reorder the list of recommended corrective actions.

Specific features of a search tool 18 appropriate for the present invention should preferably include: the ability to process variable length patterns; the provision of a mask register to specify which portions of a recall data pattern and a stored data pattern must match (subspace mask); adjustable similarity criteria; ordered output lists; an inexact search; and the ability to associate a data pattern with a label. Although described in this embodiment as a parallel associative memory (PAM), other types of search tools 18 may be used, although the test station 10 may not be as fast or as accurate.

Figure 2:
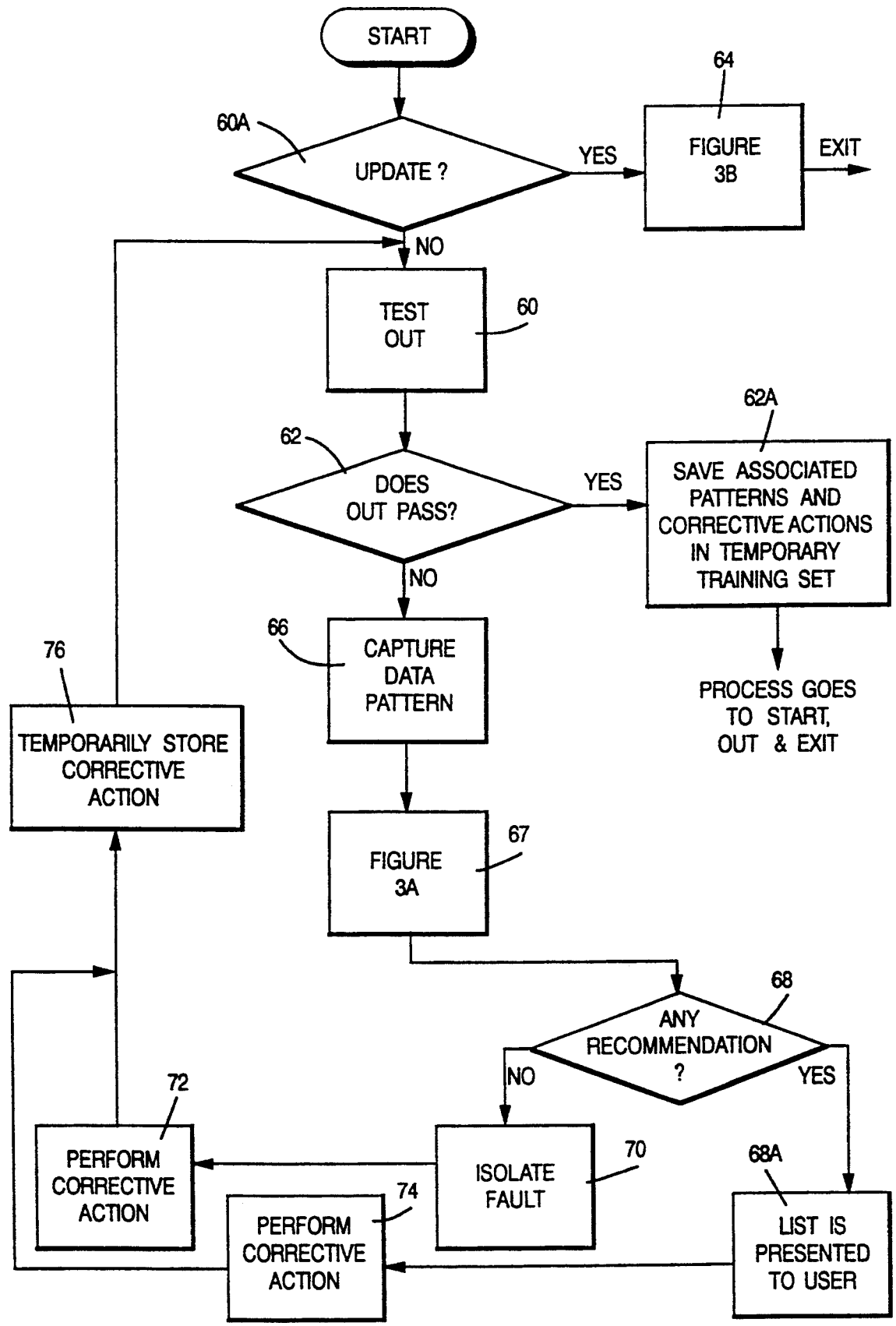
FIG. 2 shows a diagram of a process flow for the arrangement of FIG. 1.

An example of the operation of the test station 10 is shown in the process flow diagram in FIG. 2. When a test station 10 has been assembled and introduced into a manufacturing or field return repair operation, the learning process can begin. Initially, the production database 27 of the search tool 18 is empty and if a fault is detected on a UUT 12, no recommendations can be provided to the diagnostician. This is one instance when the test station 10 recognizes that it cannot make a recommendation based on the established similarity criteria. However, the first data pattern and associated label pair presented to the learning algorithm is the start of the learning process for the system.

As data patterns representing characteristics of faults and their associated labels representing recommendations are acquired, the test station 10 increases in identification accuracy. Referring to FIG. 2, the process starts at 60A. Here, if there are any new data patterns and associated labels in a temporary training set database, the diagnostician can choose to update the production database 27 in block 64 (see FIG. 3b). Or, the update can be performed automatically when a certain condition such as a new data pattern and label association is encountered, or when a set of new data patterns and associated labels is encountered, or at fixed intervals of time. This updating can be achieved automatically by using the batch processing function of the control computer. If the temporary training set database is empty or does not exist when the update block 64 is entered, the system simply exits without updating the production database. The update process is shown in more detail in FIG. 3b.

In block 60, the stimulus begins to execute in UUT 12. In this embodiment, the stimulus was the built-in self test of the UUT 12 and the computer's operating system. However, any stimulus which can detect the desired conditions can be utilized. At the decision block 62, the test station 10 determines whether the UUT 12 passes the tests. If the UUT 12 passes so that there is no fault detected, the UUT 12 exits the system (block 62A) and process control is returned to start 60A. No data is saved in block 62A since incomplete data was captured from the UUT 12. In this embodiment, an operating system prompt seen on terminal 25 from the operating system loaded into the UUT 12 is used to indicate a passing UUT 12. All other conditions indicate possible defects.

If the UUT 12 does not pass the tests in decision block 62, then data may be captured in block 66. After captured data is obtained from a defective UUT 12, it is processed into a data pattern in block 67 and is used to search the production database 27 in block 86. When the production database is empty, there will be no recommendation list generated in block 88. Thus, the decision block 68 will indicate that there are no recommendations and the fault will have to be identified by any other means in block 70. (Block 67 is described in more detail later with reference to FIG. 3a). After the fault identification process is complete, a single corrective action is performed in block 72.

The corrective action and the data pattern are stored in a temporary database in block 76. The UUT 12 is then retested in block 60 to verify the correctness of the repair. If the UUT 12 passes the test, the fault will be considered to be repaired and the data pattern and the corrective action temporarily stored in block 76 will be stored in the temporary training set database in block 62A. The UUT 12 then exits the process and control returns to start 60A.

Note that during this second test, if a fault is detected and this re-test of the UUT 12 produces a second data pattern which is the same as the originally captured data pattern in block 66, then it is assumed that the performed corrective action had no effect. The diagnostician can then choose another corrective action. This process of capturing a data pattern, performing a corrective action 72 and re-testing the UUT 12, continues until either the performed corrective action repairs the fault or the re-captured data pattern is not the same as the originally captured data pattern. This second situation suggests that the potential for multiple defects on the UUT 12 may exist.

After some learning has occurred through the process of capturing data patterns and performing corrective actions via blocks 66, 67, 68, 70, 72, 76 in FIG. 2 (as few as one pattern and associated corrective action) and by updating the production database 27 in block 64, the test station 10 is capable of making recommendations. If a data pattern which meets the similarity criteria (i.e. falls within the distance threshold of a hypersphere) is captured, a list of one or more recommendations is presented to the diagnostician in block 68A. The diagnostician then has several choices: using the first recommendation provided by the test station 10; using any other recommendation provided by the test station 10; using the recommendation list as a basis for further diagnosis, thus narrowing the search space; or performing any corrective action not on the recommendation list using other criteria. This repair is performed in block 74. The capture/perform corrective action/re-test loop (blocks 60, 62, 66, 67, 68, 74, 76 or blocks 60, 62, 66, 67, 68, 70, 72, 76) described above continues until the UUT 12 is repaired or the criteria for one of the special exit conditions described below is satisfied. In block 76, the corrective action performed in either block 72 or 74 and the data captured in block 66 is temporarily saved. After the UUT 12 passes decision block 62 positively, the most recently performed corrective action is associated with the data pattern and stored in a temporary training set database in block 62A.

Special exit conditions for the purposes of removing UUT's from the process (not shown in FIG. 2) are as follows. In one exit condition, a fault is encountered which cannot be identified in a reasonable period of time. In this situation, all the information associated with that UUT 12 is deleted from the temporary database in block 76. This is done to reduce the likelihood of corrupting any of the databases.

Second, when the test station 10 detects a fault and no data pattern is captured, as much information as possible about the UUT 12 is automatically stored, and a message is sent to the operator terminal 24, notifying the operator of this abnormal condition. Since the UUT 12 satisfies one of the special exit criteria, it can exit the process. An orderly exit of the UUT 12 is then performed (i.e. all data concerning the UUT 12 is discarded and the diagnostician is asked to remove the UUT 12 from the test station 10).

Third, when a stimulus is applied in 60 and a fault still exists, but the captured data pattern differs from the originally captured data pattern, several possibilities exist. The first likely possibility is that the diagnostician introduced an error while performing the previous corrective action. In this instance, the test station 10 provides the diagnostician the chance to recheck his work. This proceeds as follows: if the diagnostician is able to recover the original data pattern by rework, then the corrective action is assumed to be ineffective. If this rework corrects the fault, meaning that the original corrective action was correct even though the diagnostician introduced a second fault (by rework), then the UUT 12 has been repaired and it exits the system.

When the diagnostician is unable to recover the original data pattern or repair the UUT 12, a second likely possibility is that the corrective action changed the data pattern and the UUT 12 may have multiple faults. In this case, the test station 10 deletes all information associated with that UUT 12 from the temporary database and advises the diagnostician to remove the UUT 12 from the test station 10. This embodiment does not handle multiple faults on a single UUT 12. However, this method is extensible to multiple faults with little modification.

Figure 3A:
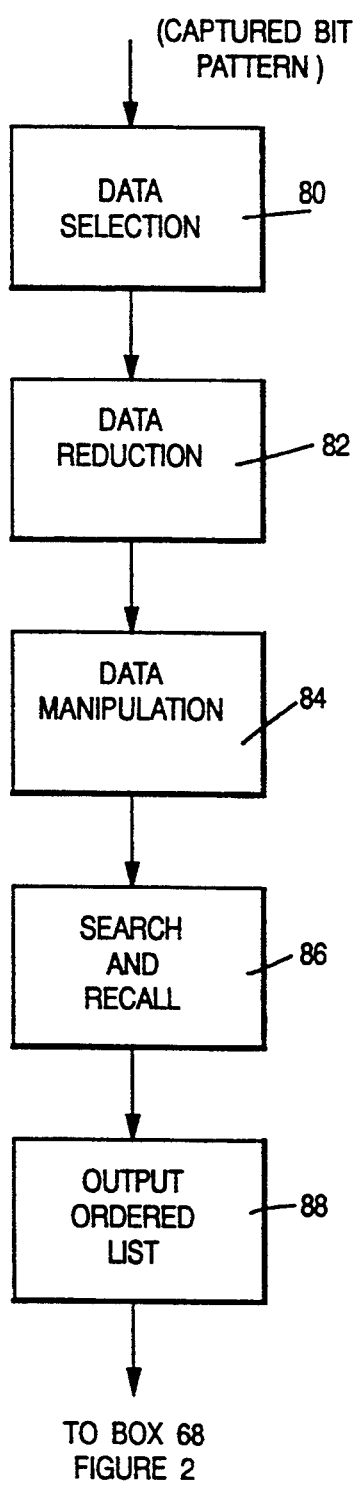
FIGS. 3A and 3B show detailed flow diagrams of portions of FIG. 2.

A more detailed flow chart of block 67 is shown in FIG. 3a. The first blocks are the data selection and reduction blocks 80, 82, which receive the captured data pattern from block 66 of FIG. 2. In this embodiment, if/then programming constructs are used to select data from the data collection device based on the built-in self. test. This takes advantage of domain-specific knowledge about how many and which logic analyzer states are most useful for isolating the defect this knowledge being obtained from domain experts. The data selection 80 and reduction process 82 is not necessary, but decreases the amount of storage required, and potentially increases identification accuracy. In this exemplary embodiment, only complete 32-bit addresses and 32-bit data states are discarded. However, in some embodiments, portions of these 32-bit fields are discarded.

In block 84, the captured data is converted in this embodiment from the UUT 12's hexadecimal format to binary format so that Hamming distance can be used as a similarity measurement. Other types of data manipulation could be used to process the captured data. In traditional methods for diagnosing UUT's, the troubleshooting technician must be able to interpret the captured data. However, the exemplary embodiment of the present invention can utilize captured data and data patterns which are not recognizable or meaningful to a human. In addition, this method will achieve some degree of success regardless of the data captured and the data representation chosen. Identification accuracy is improved if the captured data contains sufficient information to disambiguate between the desired conditions.

The search tool 18 performs the search and recall in block 86 for data patterns similar to the recall data pattern, with associated corrective action labels being recalled for similar data patterns. When there are any data patterns which meet the similarity criteria, they are considered "matches" and an ordered output list is produced in block 88, listing the recommended corrective action(s) appropriate for the recall data pattern. Different search algorithms may be utilized by the search tool 18 to search the production database, including but not limited to best match(es), nearest-neighbor(s), nearest-surface(s).

Figure 3B:
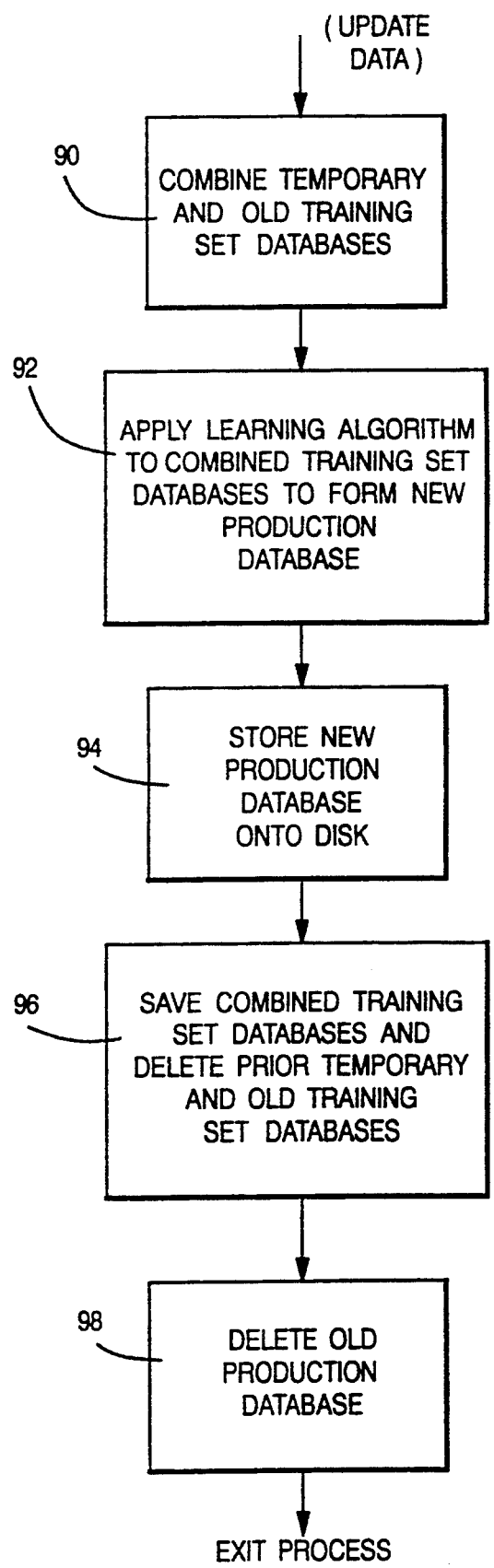
Figure 5:
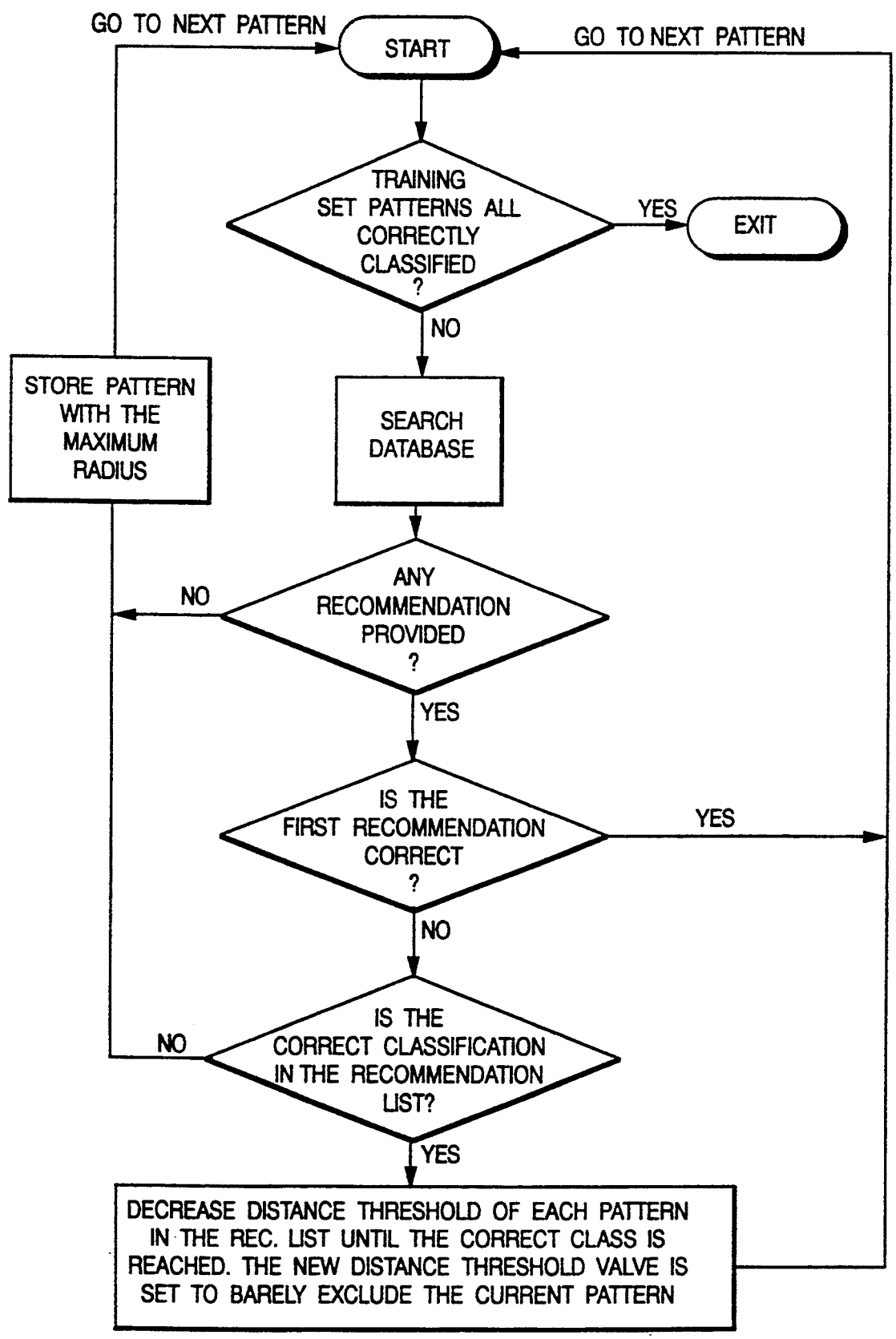
FIG. 5 is a flow diagram of an exemplary embodiment of a learning algorithm for the present invention.

FIG. 3b is a more detailed flow diagram of the update process shown in block 64 in FIG. 2. In block 90, the data patterns and their associated labels in the temporary training set database are combined with the data patterns from the old training set database. The temporary training set database contains the new data patterns and associated labels which have not been already been presented to the learning algorithm. The old training set database contains previously captured data patterns and associated labels which have already been presented to the learning algorithm. The learning algorithm of FIG. 5 is applied in block 92 to this set of combined data patterns and associated labels to form a new production database, which gets loaded into the search tool 18. The new production database is stored onto a disk in block 94. The combined data patterns and their associated labels are saved (becomes the new "old training set database") and the prior temporary and old training set databases are deleted in block 96. In block 98, the old production database is deleted, after which the process is exited.

FIG. 2 describes the process for a single UUT 12 at a time. However, the exemplary embodiment of the invention includes the ability to handle and track multiple UUT's 12 through the process simultaneously by using the UUT 12's serial number and date-time information. Whenever a UUT 12 is at block 60 of FIG. 2, all data associated with the UUT 12 can be saved to continue the fault identification process at a later time. New UUT's 12 may also enter at test UUT 60. The only way a UUT 12 can exit the process is by answering the decision block 62 (a "yes"), or by satisfying one of the special exit conditions detailed above.

Multiple corrective actions are able to be performed in the block 72 and 74 with modification to the learning algorithm. The learning algorithm then incorporates probability and set theory analysis to provide recommendations.

FIG. 5 illustrates an example of a learning algorithm which can be used with the present invention. Any supervised learning algorithm which is supported by the search tool 18 and can disambiguate the desired faults can be used. This includes many off-the-shelf learning algorithms. Training or learning is the process of adding information to the production database and creating an internally consistent representation of data patterns and associated labels. Before the production database 27 can be used to identify unknown data patterns, it must be trained using supervised learning. This means that data patterns and their correct labels must be provided to the learning algorithm. During the learning process for the search tool 18, in this embodiment the data patterns and associated labels for the training set database are acquired one at a time. This learning can occur while the test station 10 is making recommendations. Therefore, it is not necessary for the invention to undergo an isolated training period before it has value as a fault identification tool.

A learning algorithm iterates through the training set data to configure the production database 27 such that all training set data patterns are associated with their correct labels. The learning algorithm used in the described embodiment of the present invention allows maximum overlap between hyperspheres while still insuring that the correct identification is at the top of the recommendation list. This allows the search tool 18 to return an ordered list of the most similar patterns/corrective action labels from the production database. Producing a list of recommendations instead of a single recommendation may allow for greater identification accuracy, and can provide a starting point for additional diagnosis if all recommendations are incorrect or if the diagnostician decides to diagnose the UUT 12 by other means. The flow of the learning algorithm is adequately described by FIG. 5 such that further description of this Figure is unnecessary.

The above description describes a single exemplary embodiment of the test station 10 of the present invention. If additional similar test stations exist for the same product and these test stations capture and represent data in the same manner, then two or more of these test stations can share data in the following manner. The update process involves combining the temporary training set databases and the old training set databases from one or more test stations and invoking the learning algorithm. Once a production database 27 has been trained, it can be redistributed to one or more test stations which are using the process of the present invention on the same product to capture and represent data in the same manner. This feature allows rapid startup of a new test stations at a different location. In other words, the test station can learn from data from a test station at a different physical location as if it were captured locally.

Selective sharing of data can also be accomplished by the present invention. Selective sharing requires a human or intelligent program to select which data patterns and associated label pairs should be shared or not shared with other test stations 10. If a particular defect is known to appear in an isolated geographic region, those data pattern/corrective action pairs may be shared with nearby test stations 10, but not used by test stations 10 not encountering this particular situation. For example, during thunderstorm seasons, computers in the South West portion of the United States appear to have a high incidence of defects caused by lightning. This type of data may not need to be shared with locations which do not experience this phenomena such as in the North East.

As can be seen from the above description, the present invention provides a method and an apparatus for isolating and identifying faults. The invention does this even for data patterns to which the system has never been exposed. Instead of requiring an exact match to a stored data pattern, the test station 10 is capable of recognizing when a recall data pattern satisfies one or more similarity criteria of stored data patterns. When this condition is satisfied, recommendations are provided.

Although the invention has been described with a specific example of a fault identification system, it is to be understood that the invention can be applied to identify faults other than those for computer boards. There are no known limitations as to the type of faults that can be identified using the present invention. This can be done even for analog type signals. As such, the present invention could be applied to analyze power supplies, mechanical vibrations of turbine blades etc. Therefore the scope of the present invention is to be limited only by the terms of the following claims.

What is claimed is:

1. A computer-based method for identifying faults in a system, the system comprising a plurality of mechanical or electrical components that operate in a plurality of states, the components of the system being arranged to output data indicative of their respective performance during any given state, the method comprising the steps of:
   a) capturing data representative of a state of the system when a fault occurs;
   b) processing the captured data into a recall data pattern;
   c) providing a production database comprising a plurality of data entries, each data entry representative of one or more instances when the system is faulting in a particular state, each data entry having associated with it a label that identifies a proper response to correct at least one system fault for the particular state, the production database having associated with it a similarity criteria being a measure of similarity and comprising parameters within which the recall data pattern is considered similar to a data entry;

d) comparing the recall data pattern with each one of the plurality of data entries in the production database to determine an ordered recommendation list of data entries, each data entry in the ordered recommendation list satisfying the similarity criteria when compared with the recall data pattern;

e) returning the ordered recommendation list of data entries and each label from the production database associated with each data entry in the ordered recommendation list;

f) accepting as input to the computer additional information concerning actions to take to correct a fault in a given state, when there is no data entry in the production database satisfying the similarity criteria when compared with the recall data pattern;

g) creating a new data entry in the production database using the captured information on a fault for a given state of the system and associating with the new data entry a new label comprising the additional information concerning the actions to take to correct the fault; and h) training the production database by adjusting the parameters of similarity criteria corresponding to the data entries, according to a preselected learning scheme, said learning scheme utilizing the new data entry when adjusting the parameters.

2. The method of claim 1, wherein the similarity criteria are distance thresholds, and further comprising loading the production database into a parallel associative memory.

3. The method of claim 1 wherein the step of processing the captured data further comprises the step of processing the captured data into recall data patterns of variable lengths.

4. The method of claim 1, wherein said recall data patterns are machine readable.

5. The method of claim 1, wherein the step of processing the captured data includes processing the captured data such that similar data patterns are associated with a same repeat fault, and dissimilar data patterns are associated with different repeat faults.

6. The method of claim 1, wherein the step of processing the captured data processes the captured data into a recall data pattern without manipulation.

7. The method of claim 1, further comprising using if/then programming constructs in the step of processing the captured data.

8. The method of claim 1, wherein the associated labels are hierarchical.

9. The method of claim 1, wherein the step of processing the captured data includes the step of converting the captured data from hexadecimal to binary format.

10. The method of claim 1, wherein the step of returning the ordered recommendation list of data entries further comprises the step of ordering the ordered recommendation list in accordance with the degree of similarity between each data entry in the ordered recommendation list and the recall data pattern.

11. The method of claim 1, further comprising providing an indication of no inexact match if no data entry in the production database satisfies the similarity criteria when compared with the recall data pattern.

12. The method of claim 1, wherein the step of comparing includes searching the production database using one of the searches: best match, nearest-neighbor or nearest-surface.

13. The method of claim 1, further comprising returning a distance measure between the recall data pattern and the data entry for each data entry in the ordered recommendation list.

14. The method of claim 1, wherein the similarity criteria is a Hamming distance between the recall data pattern and the data entries.

15. The method of claim 1, wherein the comparing step is performed by a search tool capable of performing the following functions: processing variable length recall data patterns; masking portions of the recall data pattern such that the unmasked portions must match between the recall data pattern and the data entries; adjusting similarity criteria associated with each data entry; providing an ordered output list; performing inexact searching; and associating a data entry with a variable length label.

16. The method of claim 1, further comprising the step of providing multiple production databases, wherein the step of processing the captured data includes breaking apart said captured data into parts and the step of comparing includes searching multiple production databases in parallel with said parts as recall data patterns.

17. The method of claim 1, wherein the step of comparing includes performing a hierarchical search using multiple production databases.

18. The method of claim 1, comprising the further step of updating the production database at specified time intervals.

19. The method of claim 1, wherein the production database is updated upon an operator request.

20. The method of claim 1, wherein said step of training the production database is performed automatically.

21. The method of claim 1, wherein the step of training the production database includes merging a plurality of training sets, the training sets each comprising a production database of data entries.

22. The method of claim 1, further comprising the further step of distributing a trained production database to separate locations.

23. The method of claim 1, comprising the further step of utilizing the learning scheme to perform search space partitioning using hyperspheres.

24. The method of claim 1, further comprising returning with said associated label one of: cost of repairing an identified repeat fault; time for repairing an identified repeat fault; and historical frequency data.

25. The method of claim 24, further comprising modifying a list of returned associated labels according to one of said cost of repairing, said time for repairing, and said historical frequency data.

26. The method of claim 1, wherein said step of processing the captured data includes discarding data elements of said captured data.

27. The method of claim 26, wherein said discarded data elements include logic analyzer states.

28. The method of claim 26, wherein the discarding of data elements is performed in accordance with domain-specific knowledge.

29. The method of claim 1, wherein the sep of comparing includes performing a hierarchical search which depends on previous search results.

30. The method of claim 29, wherein the hierarchical search includes performing an initial best match search using subspace mask restrictions, and if no associated label can be returned, repeating the search after removing at least one of the subspace mask restrictions.

31. The method of claim 30, wherein the subspace mask restrictions include a failing self-test and a trigger address.

32. The method of claim 1 wherein the step of training the production database comprises the step of adjusting the parameters of the similarity criteria associated with the data entries by utilizing the recall data patterns when adjusting the parameters.

33. The method of claim 32, wherein the step of training the production database is performed after a single recall data pattern and associated label are presented to the learning scheme.

34. The method of claim 32, wherein the step of training the production database includes using the similarity criteria as an input to the learning scheme.

35. The method of claim 32, wherein the learning scheme allows maximally overlapping hyperspheres obtained by using initial distance thresholds of maximum size and decreasing a distance threshold associated with a data entry only as needed to exclude an incorrect recall data pattern.

36. The method of claim 32, comprising the further step of updating the production database after a specified number of data patterns are captured.

37. The method of claim 36, wherein the step of updating is performed by a batch processing function.

38. The method of claim 32, wherein the step of training the production database includes merging a plurality of training sets, the training sets each comprising a production database of stored data patterns.

39. The method of claim 38, wherein the data entries and associated label pairs in said plurality of training sets are selectable.

40. The method of claim 32, wherein the step of training the production database includes: increasing a distance threshold associated with a data entry; decreasing a distance threshold associated with a data entry; drifting a data entry; storing newly presented data entries; and deleting data entries.

41. The method of claim 40, wherein returning an incorrect associated label causes the recall data pattern to be stored, and a distance threshold associated with a data entry to be decreased.

42. The method of claim 1, wherein the system is a unit under test (UUT) of a computer system and said captured data are machine states of said UUT.

43. The method of claim 42, wherein said faults are characteristic of either correct or incorrect conditions of said UUT, a correct condition being indicated by a prompt from an operating system of the computer system.

44. The method of claim 42, wherein said step of capturing data includes scanning an output of a console terminal of the UUT.

45. The method of claim 42, wherein each associated label in the production database is a component of the UUT.

46. The method of claim 42, wherein each associated label in the production database is a recommended repair activity.

47. The method of claim 42, further comprising providing a stimulus to said unit under test to generate data to be captured.

48. The method of claim 47, wherein said stimulus are a built-in self test and an operating system of the computer.

49. The method of claim 48, further comprising using a subspace mask of a parallel associative memory to direct the step of comparing in accordance with a hierarchy of the built-in self test.

50. The method of claim 48, further comprising detecting an infinite loop or machine stoppage from domain-specific knowledge of completion times for portions of the built-in self test.

51. The method of claim 42, wherein said step of capturing data is performed by a logic analyzer.

52. The method of claim 51, wherein said step of capturing data includes capturing up to 1024 32-bit logic analyzer states using a strobe line of the UUT.

53. The method of claim 51, wherein said step of capturing data includes capturing either output or lack of output from a console terminal of the UUT.

54. The method of claim 51, wherein said step of capturing data includes capturing an indication of which section of a built-in self test the computer is currently executing.

55. The method of claim 51, further comprising using a subspace mask of a parallel associative memory to direct the step of comparing in accordance with data elements of the logic analyzer.

56. A computer device for identifying faults in a system, the system comprising a plurality of mechanical or electrical components that operate in a plurality of states, the components of the system being arranged to output data indicative of their respective performance during any given state, the device comprising:

a) a computer processor coupled to the components of the system to receive as input state data representative of a state of the system when a fault occurs;

b) a production database coupled to the computer processor and storing a plurality of data entries concerning one or more instances when the system was faulting in a particular state, each entry having associated with it a label that identifies a proper response to correct at least one system fault for the particular state, the production database having associated with it a similarity criteria being a measure of similarity and comprising parameters within which the state data is considered similar to the values of a given data entry in the production database;

c) the computer processor including means to compare the state data with all the data entries in the production database to determine if the state data satisfies the similarity criteria with respect to each of the plurality of data entries in the production database;

d) the computer processor including means to output each label associated with each data entry in the production database that satisfies the similarity criteria;

e) an input device coupled to the computer processor for accepting input concerning actions to take to correct a fault in a given state when there is not data entry in the production database that satisfies the similarity criteria with respect to the state data;

f) the computer processor including means to create a new entry in the production database using the input data representative of a fault for a given state of the system and associating with the new entry a new label comprising the additional information concerning the actions to take to correct the fault; and g) the computer including means to train the production database by adjusting the parameters of the similarity criteria, according to a preselected learning scheme, said learning scheme utilizing the new entry when adjusting the parameters.

57. A computer-based method for identifying faults in a system, the system comprising a plurality of mechanical or electrical components that operate in a plurality of states, the system being a unit under test of a computer system, the components of the system being arranged to output data indicative of their respective performance during any given state, the method comprising the steps of:

a) providing a stimulus to said unit under test to generate data to be captured, said stimulus being a built-in self test and an operating system of the computer system;

b) capturing data representative of a state of the system when a fault occurs, said captured data being machine states of said unit under test;

c) processing the captured data into a recall data pattern;

d) providing a production database comprising a plurality of data entries, each data entry representative of one or more instances when the system is faulting in a particular state, each data entry having associated with it a label that identifies a proper response to correct at least one system fault for the particular state, the production database having associated with it a similarity criteria being a measure of similarity and comprising parameters within which the recall data pattern is considered similar to a data entry;

e) comparing, using a subspace mask of a parallel associative memory in accordance with a hierarchy of the built-in self test, the recall data pattern with each one of the plurality of data entries in the production database to determine an ordered recommendation list of data entries, each data entry in the ordered recommendation list satisfying the similarity criteria when compared with the recall data pattern; and f) returning the ordered recommendation list of data entries and each label from the production database associated with each data entry in the ordered recommendation list.

58. A computer-based method for identifying faults in a system, the system comprising a plurality of mechanical or electrical components that operate in a plurality of states, the system being a unit under test of a computer system, the components of the system being arranged to output data indicative of their respective performance during any given state, the method comprising the steps of:

a) capturing, using a logic analyzer, data representative of a state of the system when a fault occurs, said captured data being machine states of said unit under test;

b) processing the captured data into a recall data pattern;

c) providing a production database comprising a plurality of data entries, each data entry representative of one or more instances when the system is faulting in a particular state, each data entry having associated with it a label that identifies a proper response to correct at least one system fault for the particular state, the production database having associated with it a similarity criteria being a measure of similarity and comprising parameters within which the recall data pattern is considered similar to a data entry;

d) comparing, using a subspace mask of a parallel associative memory in accordance with data elements of the logic analyzer, the recall data pattern with each one of the plurality of data entries in the production database to determine an ordered recommendation list of data entries, each data entry in the ordered recommendation list satisfying the similarity criteria when compared with the recall data pattern; and e) returning the ordered recommendation list of data entries and each label from the production database associated with each data entry in the ordered recommendation list.

59. A computer-based method for identifying faults in a system, the system comprising a plurality of mechanical or electrical components that operate in a plurality of states, the components of the system being arranged to output data indicative of their respective performance during any given state, the method comprising the steps of:

a) capturing data representative of a state of the system when a fault occurs;

b) processing the captured data into a recall data pattern using if/then programming constructs;

c) providing a production database comprising a plurality of data entries, each data entry representative of one or more instances when the system is faulting in a particular state, each data entry having associated with it a label that identifies a proper response to correct at least one system fault for the particular state, the production database having associated with it a similarity criteria being a measure of similarity and comprising parameters within which the recall data pattern is considered similar to a data entry;

d) comparing the recall data pattern with each one of the plurality of data entries in the production database to determine an ordered recommendation list of data entries, each data entry in the ordered recommendation list satisfying the similarity criteria when compared with the recall data pattern; and e) returning the ordered recommendation list of data entries and each label from the production database associated with each data entry in the ordered recommendation list.

60. A computer-based method for identifying faults in a system, the system comprising a plurality of mechanical or electrical components that operate in a plurality of states, the components of the system being arranged to output data indicative of their respective performance during any given state, the method comprising the steps of:

a) capturing data representative of a state of the system when a fault occurs;

b) processing the captured data into a recall data pattern;

c) providing a production database comprising a plurality of data entries, each data entry representative of one or more instances when the system is faulting in a particular state, each data entry having associated with it a label that identifies a proper response to correct at least one system fault for the particular state, the production database having associated with it a similarity criteria being a measure of similarity and comprising parameters within which the recall data pattern is considered similar to a data entry;

d) comparing the recall data pattern with each one of the plurality of data entries in the production database to determine an ordered recommendation list of data entries, each data entry in the ordered recommendation list satisfying the similarity criteria when compared with the recall data pattern;

e) ordering the ordered recommendation list in accordance with the degree of similarity between each data entry in the ordered recommendation list and the recall data pattern; and f) returning the ordered recommendation list of data entries and each label from the production database associated with each data entry in the ordered recommendation list.

61. A computer-based method for identifying faults in a system, the system comprising a plurality of mechanical or electrical components that operate in a plurality of states, the components of the system being arranged to output data indicative of their respective performance during any given state, the method comprising the steps of:

a) capturing data representative of a state of the system when a fault occurs;

b) processing the captured data into a recall data pattern;

c) providing a production database comprising a plurality of data entries, each data entry representative of one or more instances when the system is faulting in a particular state, each data entry having associated with it a label that identifies a proper response to correct at least one system fault for the particular state, the production database having associated with it a similarity criteria being a measure of similarity and comprising parameters within which the recall data pattern is considered similar to a data entry;

d) comparing the recall data pattern with each one of the plurality of data entries in the production database to determine an ordered recommendation list of data entries, each data entry in the ordered recommendation list satisfying the similarity criteria when compared with the recall data pattern; and e) returning the ordered recommendation list of data entries and each label from the production database associated with each data entry in the ordered recommendation list;

wherein the comparing step is performed by a search tool capable of performing the following functions: processing variable length recall data patterns; masking portions of the recall data pattern such that the unmasked portions must match between the recall data pattern and the data entries; adjusting similarity criteria associated with each data entry; providing an ordered output list; performing inexact searching; and associating a data entry with a variable length label.

62. A computer-based method for identifying faults in a system, the system comprising a plurality of mechanical or electrical components that operate in a plurality of states, the components of the system being arranged to output data indicative of their respective performance during any given state, the method comprising the steps of:

a) capturing data representative of a state of the system when a fault occurs;

b) dividing the captured data into parts;

c) processing each part of the captured data into a corresponding recall data pattern;

d) providing multiple production databases, each production database comprising a plurality of data entries, each data entry representative of one or more instances when the system is faulting in a particular state, each data entry having associated with it a label that identifies a proper response to correct at least one system fault for the particular state, each production database having associated with it a similarity criteria being a measure of similarity and comprising parameters within which the recall data pattern is considered similar to a data entry;

e) searching the multiple production databases in parallel by comparing each recall data pattern with each one of the plurality of data entries in one of the multiple production databases to determine an ordered recommendation list of data entries, each data entry in the ordered recommendation list satisfying the similarity criteria when compared with the recall data pattern; and f) returning the ordered recommendation list of data entries and each label from the production database associated with each data entry in the ordered recommendation list.

63. A computer-based method for identifying faults in a system, the system comprising a plurality of mechanical or electrical components that operate in a plurality of states, the components of the system being arranged to output data indicative of their respective performance during any given state, the method comprising the steps of:

a) capturing data representative of a state of the system when a fault occurs;

b) processing the captured data into a recall data pattern;

c) providing a production database comprising a plurality of data entries, each data entry representative of one or more instances when the system is faulting in a particular state, each data entry having associated with it a label that identifies a proper response to correct at least one system fault for the particular state, the production database having associated with it a similarity criteria being a measure of similarity and comprising parameters within which the recall data pattern is considered similar to a data entry;

d) comparing the recall data pattern with each one of the plurality of data entries in the production database to determine an ordered recommendation list of data entries, each data entry in the ordered recommendation list satisfying the similarity criteria when compared with the recall data pattern, wherein the step of comparing includes performing a hierarchical search which depends on previous search results; and e) returning the ordered recommendation list of data entries and each label from the production database associated with each data entry in the ordered recommendation list.

64. A computer-based method for identifying faults in a system, the system comprising a plurality of mechanical or electrical components that operate in a plurality of states, the components of the system being arranged to output data indicative of their respective performance during any given state, the method comprising the steps of:

a) capturing data representative of a state of the system when a fault occurs;
b) processing the captured data into a recall data pattern;
c) providing a production database comprising a plurality of data entries, each data entry representative of one or more instances when the system is faulting in a particular state, each data entry having associated with it a label that identifies a proper response to correct at least one system fault for the particular state, the production database having associated with it a similarity criteria being a measure of similarity and comprising parameters within which the recall data pattern is considered similar to a data entry;
d) comparing the recall data pattern with each one of the plurality of data entries in the production database to determine an ordered recommendation list of data entries, each data entry in the ordered recommendation list satisfying the similarity criteria when compared with the recall data pattern;
e) returning the ordered recommendation list of data entries and each label from the production database associated with each data entry in the ordered recommendation list;
f) providing a training database comprising a second plurality of data entries representative of one or more instances when the system is faulting in a particular state, each one of the plurality of data entries having associated with it a second label that identifies a proper response to correct at least one system fault for the particular state;
g) adding the second plurality of data entries and the second labels from the training database to the production database; and
f) training the production database using a learning algorithm by dynamically changing the similarity criteria as the second plurality of data entries and the second labels are added to the production database.

65. A computer-based method for identifying faults in a system, the system comprising a plurality of mechanical or electrical components that operate in a plurality of states, the components of the system being arranged to output data indicative of their respective performance during any given state, the method comprising the steps of:
a) capturing data representative of a state of the system when a fault occurs;
b) processing the captured data into a recall data pattern;
c) providing a production database comprising a plurality of data entries, each data entry representative of one or more instances when the system is faulting in a particular state, each data entry having associated with it a label that identifies a proper response to correct at least one system fault for the particular state, the production database having associated with it a similarity criteria being a measure of similarity and comprising parameters within which the recall data pattern is considered similar to a data entry;
d) comparing the recall data pattern with each one of the plurality of data entries in the production database to determine a recommendation list of data entries, each data entry in the recommendation list satisfying the similarity criteria when compared with the recall data;
e) returning the recommendation list of data entries and each label from the production database associated with each data entry in the recommendation list; and
f) if the recommendation list does not have a successful recommendation, modifying the similarity criteria.

* * * * *